United States Patent [19]

Reaves

[11] 4,379,543
[45] Apr. 12, 1983

[54] VANE TYPE VALVE ACTUATOR
[75] Inventor: V. Randon Reaves, Houston, Tex.
[73] Assignee: Valinco, Inc., Houston, Tex.
[21] Appl. No.: 175,661
[22] Filed: Aug. 5, 1980
[51] Int. Cl.³ .............................. F01C 9/00; F16J 1/10
[52] U.S. Cl. .......................................... 251/59; 92/63;
 92/121; 92/129; 92/130 A; 92/130 C
[58] Field of Search ................. 92/63, 64, 129, 130 A,
 92/130 C, 120, 121, 122, 123, 124, 125; 91/170 R,
 44, 45; 251/59

[56] References Cited
U.S. PATENT DOCUMENTS

| 593,996 | 11/1897 | Fish | 92/121 |
| 2,984,405 | 5/1961 | Stump | 92/129 |
| 2,988,058 | 6/1961 | Warnecke | 91/44 |
| 3,051,143 | 8/1962 | Nee | 92/121 |
| 3,136,227 | 6/1964 | Williams | 92/130 A |
| 3,824,901 | 7/1974 | Shafer | 92/130 C |
| 4,087,074 | 5/1978 | Mossey et al. | 92/130 A |

Primary Examiner—Paul E. Maslousky
Attorney, Agent, or Firm—Gunn, Lee & Jackson

[57] ABSTRACT

In the preferred and illustrated embodiment of a valve actuator, a vane type fail safe actuator is disclosed. The actuator comprises a housing enclosing a vane which is integral with a shaft extending through the housing to a rotary operable valve. Fail safe operation is provided by a spring return mechanism connected to the housing. Compressed air is utilized to operate the actuator and the spring return mechanism which assures complete valve closure when the air supply fails or is reduced below a predetermined minimum setting.

6 Claims, 2 Drawing Figures

VANE TYPE VALVE ACTUATOR

BACKGROUND OF THE DISCLOSURE

This invention relates to valve actuators and more particularly to fail safe vane type actuators utilizing a spring return mechanism to assure complete valve closure.

Valve actuators are used in all segments of industry to open and close valves. Vane type valve actuators provide efficient remote control for any type of rotary operation of ball, plug and butterfly valves, or other mechanisms such as dampers, switches or safety and flow control devices. Valve actuators may be electronic or pneumatic providing reliable remote operation of valves. Reliability is very important to an operator who utilizes valve actuators to cyclically open and close a plurality of valves. Therefore, there is an industry demand for actuators that are fail safe. By fail safe, it is meant that the actuator automatically closes the valve on electrical failure or loss of air. The prior art discloses fail safe pneumatic actuators. These prior art actuators utilize air accumulators or spring return mechanisms to assure valve closure. A disadvantage associated with the prior art actuators utilizing a spring return mechanism is that the total force imparted by the compressed air is not directed to opening the valve. In these prior art actuators, compressed air is employed to open the valve and to cock or compress the spring return mechanism. Generally, the compressed air enters the vane housing and simultaneously exerts a force against the vane and the spring return mechanism. Before the valve can be opened, the compressed air must exert a force exceeding the threshold force required to compress the spring return mechanism. In addition, the prior art actuators are generally complex and bulky structures utilizing multiport valves to direct the air flow. The present invention solves the disadvantages associated with these prior art actuators.

SUMMARY

The vane type actuator of the present invention includes a vane housing and a spring return mechanism connected to the vane housing for fail safe operation of the actuator. The actuator of the invention includes an air supply providing compressed air for operation of the actuator. The compressed air provides the motive force required to move a vane or paddle in the vane housing to open a valve connected therewith. Compressed air is also utilized to simultaneously compress the spring return mechanism to a position whereby release of the compressed air permits the mechanism to move the vane to a valve closing position. The vane housing and spring return mechanism are coplanar presenting a low profile and compact structure.

It is, therefore, an object of the present invention to provide a fail safe vane type pneumatic actuator. This is accomplished by a feature of the invention providing a spring return mechanism assuring complete valve closure upon failure of the air supply.

It is a feature of the invention to provide a fail safe pneumatic actuator whereby all available torque is utilized to open a valve connected to the actuator. This is accomplished by providing compressed air for separately compressing the spring mechanism to a retracted position while simultaneously moving the vane to a valve opening position. This feature enables the full forces of the compressed air to be directed against the actuator vane to be transmitted as a torque force for opening the valve.

It is another object of the invention to provide a fail safe pneumatic actuator having a sturdy yet low profile, compact structure.

BRIEF DESCRIPTION OF THE DRAWINGS

So that the manner in which the above recited features, advantages and objects of the invention, as well as others which will become apparent, are attained and can be understood in detail, more particular description of the invention briefly summarized above may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments

DETAILED DESCRIPTION OF THE INVENTION

Figure 1:
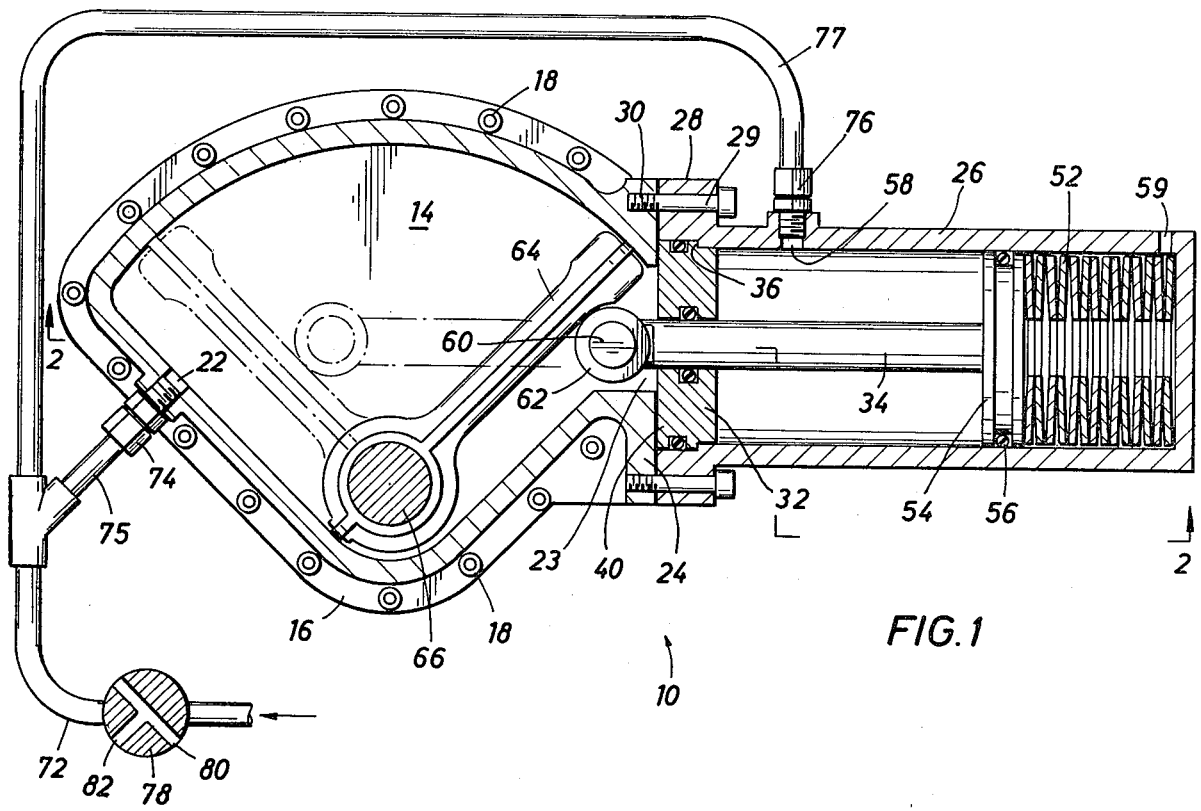
FIG. 1 is a top cross-sectional view of the preferred embodiment of the invention.

Referring first to FIG. 1, a vane actuator 10 is disclosed. The actuator 10 includes a vane housing and a spring return mechanism. The vane housing comprises an upper portion 12 and a matching lower portion 14. Both the upper and lower portions of the vane housing include a peripheral flange 16 having a plurality of equally spaced holes 18 for receiving connecting bolts 20 therethrough. A gasket or other seal means (not shown in the drawings) is provided between the upper portion 12 and the lower portion 14 to perfect a seal therebetween. When both portions of the vane housing are bolted together, it has a generally triangular shape. An air inlet opening 22 is provided through one side of the vane housing as shown in FIG. 1. An opening 23 defined by an upstanding circumferential skirt 24 is incorporated as part of the vane housing opposite the inlet opening 22. The opening 23 defines a passage for a piston rod extending from the spring return mechanism described in more detail hereinafter.

The spring return mechanism comprises a piston housing 26 open at one end. A peripheral lip 28 is provided about the open end of the housing 26 for connection to the skirt 24. The lip 28 includes a plurality of spaced holes for receiving the connecting bolts 29 which include threaded ends 30. The connecting bolts 29 are threadably received by corresponding holes incorporated in the skirt 24. The open end of the housing 26 is closed by a plug 32 having a centrally located hole for receiving a piston rod 34 therethrough. An internal shoulder 36 is provided near the open end of the housing 26. The shoulder 36 is a stop engaged by a corresponding shoulder of the plug 32 defined by an enlarged portion 40. A reduced portion of the plug 32 extends inwardly into the piston housing 26 slightly past the stop shoulder 36. A groove 42 for receiving an O-ring seal 44 is provided about the enlarged portion 40 of the plug 32 to perfect a seal therebetween. The plug 32 further includes a central opening for receiving the piston rod 34 therethrough. The central opening incorporates an internal groove 46 to receive an O-ring seal 48 perfecting a seal about the rod 34. When assembled, the plug 32 is compressed between the stop shoulder 36 and the external face 50 of the skirt 24 as best shown in FIG. 1.

A spring 52 and a piston 54 are enclosed by the piston housing 26. The spring 52 may be any commercially available spring, however, a plurality of belleville washers are preferred. Belleville washers provide the necessary spring force required to close the valve while occupying a minimum of space. The size of the housing 26 is thereby minimized, providing a compact structure. The piston 54 is provided to compress the spring 52. The piston rod 34 extends from one side of the piston 54 as shown in FIG. 1. The piston 54 includes a groove about the periphery thereof to receive an O-ring seal 56 to perfect a sliding seal. An inlet opening 58 is provided through the housing 26 near the plug 32. Compressed air is directed into the housing 26 through the opening 58 forcing the piston 54 to compress the spring 52 in a manner to be described later herein. An opening 59 is provided near the closed end of the housing 26 permitting any air accummulated in the spring portion of the housing to escape and therefore preventing the buildup of back pressure on the back side of the piston 54.

Figure 2:
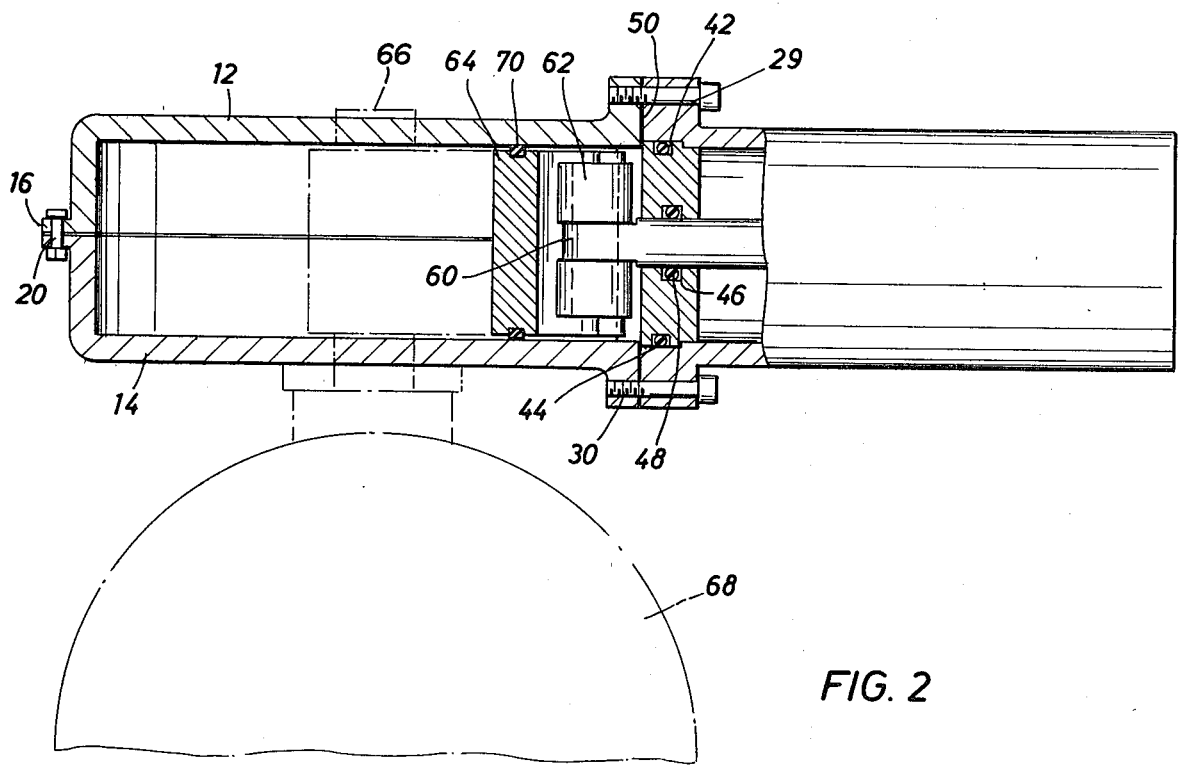
FIG. 2 is a partially broken away cross-sectional view taken along line 22 of FIG. 1 shwoing the preferred embodiment of the invention.

The piston rod 34 is an elongate solid rod welded or otherwise connected to one side of the piston 54. The piston rod 34 extends from the piston 54 through the plug 32 into the vane housing and terminates in an integral cross-bar 60 having the general configuration of a T as shown in FIG. 2. The cross-bar 60 provides a cylindrical bearing surface for the bearings 62 which contact the vane 64. The bearings 62 are preferably nylon bearings or the like, however, they may be fabricated from other suitable materials, steel for example. The bearings 62 provide a rolling surface to reduce the frictional drag encountered when the vane 64 is moved from an open position to a closed position (shown in phantom in FIG. 1). The bearing 62 also reduces wear and tear between the contact surfaces.

The vane 64 is cast integral to the shaft 66 which in turn is connected to a valve 68. The vane 64 has a paddle like configuration and is provided with an O-ring 70 received in a groove formed along the longitudinal periphery thereof. Two shaft O-rings (not shown in the drawings) are also provided to perfect a complete seal with the vane housing components 12 and 14. The O-ring 70 and the two shaft O-rings are expendable standard items available from regular commercial suppliers which collectively seal the chamber to leakage.

Compressed air is employed as the motive fluid for opening the valve 68 connected to the actuator 10. The compressed air is supplied to the vane housing and the piston housing via a tube 72 which branches into two segments. A coupling 74 connects a first segment 75 to the inlet 22. A second coupling 76 connects a second segment 77 to the inlet 58. The tube 72 is provided with a three position valve 78 for directing the compressed air to the actuator 10. The valve 78 includes a first passage 80 and a second passage 82 which terminates in the first passage 80 as shown in FIG. 1. The passage 80 is a through passage that when aligned with the tube 72 permits air to be admitted to the actuator 10. In FIG. 1, the valve 78 is shown in the closed position. The passage 82, when aligned with the tube 72, is an exhaust passage permitting the compressed air in the actuator 10 to be vented to ambient pressure. The valve 78 is preferably a solenoid or pilot operated valve.

The disclosed preferred embodiment of the actuator 10 is particularly useful for operating a plurality of valves on a timed sequence. A valve connected to an actuator 10 is readily opened and closed in a predetermined sequence by electrically or manually manipulating the three position valve 78. As air is admitted into the vane housing, the air moves the vane approximately 90 degrees to an open position. Simultaneously therewith, compressed air admitted into the housing 26 via tube segment 77 also compresses the spring 52 to a retracted position. The valve is held open by turning the three position valve 78 to the position shown in FIG. 1. To close the valve, the three position valve 78 is switched to the exhaust position to vent the compressed air from the actuator 10. As the actuator 10 is vented, the spring mechanism automatically advanced the rod 34 which in turn moves the vane 64 to a closed position assuring completes valve closure and thus fail safe operation.

While the foregoing is directed to the preferred embodiment of the present invention, other and further embodiments of the invention may be devised without departing from the basic concept thereof, and the scope thereof is determined by the claims which follow.

I claim:

1. A valve actuator, comprising:
   (a) a housing sealingly enclosing a vane connected to a valve via a shaft rotated by said vane;
   (b) means for moving said vane in said housing to a valve open position;
   (c) a movable piston and return spring enclosed by a piston housing fixedly secured to said vane housing, said piston joined to an elongate rod wherein one end of said rod protrudes through an opening in said vane housing to contact said vane;
   (d) said elongate rod including a cylindrical cross-bar perpendicularly extending from said one end of said rod, said cross-bar providing a bearing surface for a bearing means to enable rolling contact with said vane.

2. The apparatus of claim 1 wherein said piston housing comprises an elongate hollow cylinder open at one end, said open end being closed by a plug having a centrally located hole for receiving said rod therethrough, and wherein said piston housing includes an internal retaining shoulder for retaining said plug at the open end of said piston housing.

3. The apparatus of claim 2 wherein said vane housing opening is defined by a circumferential skirt connected to a peripheral lip formed on said piston housing, said skirt including a plurality of holes for threadably receiving a plurality of bolts for connecting said piston housing to said vane housing.

4. The apparatus of claim 1 wherein said bearing means comprises a pair of nylon bearings journaled on said cross-bar in rolling contact with said vane.

5. The apparatus of claim 4 including an air conduit having an end connected to a compressed air source, and a pair of outlets therefrom, one of said outlets in fluid communication with said vane housing and the other of said outlets being in fluid communication with said piston housing.

6. The apparatus of claim 5 wherein the compressed air is admitted into said vane housing and simultaneously therewith the compressed air is admitted into said piston housing via said air conduit.

* * * * *